United States Patent Office 3,066,152
Patented Nov. 27, 1962

3,066,152
CYCLOALKENIC DERIVATIVES OF
EPOXYCYCLOHEXANES
John P. Luvisi, Park Ridge, Ill., assignor to Universal Oil
Products Company, Des Plaines, Ill., a corporation of
Delaware
No Drawing. Filed Dec. 22, 1961, Ser. No. 161,356
34 Claims. (Cl. 260—348)

This application is a continuation-in-part of my copending application Serial No. 808,868, filed April 27, 1959, now abandoned, which was a copending application of Serial No. 675,006, filed July 30, 1957, now abandoned, and my copending application Serial No. 808,869, filed April 27, 1959, now abandoned, which was a copending application of Serial No. 675,007, filed July 30, 1957, now abandoned.

This invention relates to new compositions of matter and to a method for the preparation thereof, and particularly to a method for the preparation of cycloalkenic derivatives of epoxycyclohexanes.

An object of this invention is to prepare derivatives of epoxycyclohexanes by condensing unsaturated compounds with said cyclohexanes.

Taken in its broadest aspect one embodiment of this invention resides in a process which comprises condensing 1,2-epoxycyclohexane containing, as the sole additional functional group, an olefinic side chain of from 2 to about 7 carbon atoms attached to a carbon atom of the cyclohexane ring, said group consisting of carbon and hydrogen atoms, with an unsaturated compound selected from the group consisting of conjugated butadienes, cyclopentadienes, cyclohexadienes, halogenated conjugated butadienes, halogenated cyclopentadienes, and halogenated cyclohexadienes, said halogen being selected from the group consisting of chlorine, bromine, and iodine, at a temperature in the range of from about atmospheric to about 300° C. and at a pressure in the range of from about atmospheric to about 100 atmospheres.

A further embodiment of this invention is found in a process which comprises condensing 1,2-epoxycyclohexane containing, as the sole additional functional group, an olefinic side chain of from 2 to 7 carbon atoms attached to a carbon atom of the cyclohexane ring, said group consisting of carbon and hydrogen atoms, with a halogenated unsaturated compound selected from the group consisting of halogenated conjugated butadiene, cyclopentadiene and cyclohexadiene, said halogenated unsaturated compound consisting of carbon, hydrogen and halogen atoms, the halogen being selected from the group consisting of chlorine, bromine and iodine, at a temperature in the range of from about atmospheric to about 300° C. and at a pressure in the range of from about atmospheric to about 100 atmospheres.

Yet another embodiment of this invention resides in a process which comprises condensing 1,2-epoxycyclohexane containing, as the sole additional functional group, olefinic side chain of from 2 to 7 carbon atoms attached to a carbon atom of the cyclohexane ring, said group consisting of carbon and hydrogen atoms, with a conjugated halo-cyclopentadiene consisting of carbon, hydrogen and halogen atoms, the halogen being selected from the group consisting of chlorine, bromine and iodine, at a temperature in the range of from about atmospheric to about 300° C. and at a pressure in the range of from about atmospheric to about 100 atmospheres.

Still another embodiment of this invention is found in a compound having the generic formula:

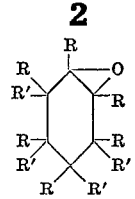

in which the R's are selected from the group consisting of hydrogen and alkyl radicals and the R"'s are selected from the group consisting of R and cyclo radicals having the generic formulae:

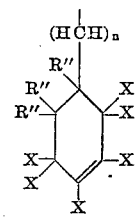

and

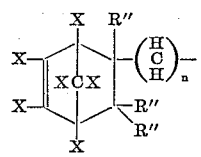

in which the X's are selected from the group consisting of hydrogen and halo radicals, the R'''s are selected from the group consisting of hydrogen and alkyl radicals, and $n$ is an integer of from 0 to about 5, at least one R' being selected from the cyclo radicals.

A specific embodiment of this invention resides in a process which comprises condensing dipentene monoxide with cyclopentadiene at a temperature in the range of from about atmospheric to about 300° C. and at a pressure in the range of from about 1 to about 100 atmospheres to form 5-methyl-5-(4-methyl-3,4-epoxycyclohexyl)-2-norbornene.

Another specific embodiment of this invention resides in a process for the preparation of 1,2,3,5-tetrachloro-4-methyl-4-(4-methyl-3,4-epoxycyclohexyl)cyclohexene which comprises condensing dipentene monoxide with 1,2,3,4-tetrachloro-1,3-butadiene at a temperature in the range of from about atmospheric to about 300° C. and at a pressure in the range of from about 1 to about 100 atmospheres.

Yet another specific embodiment of this invention resides in 1,2,3,4,7,7-hexachloro-5-methyl-5-(4-methyl-3,4-epoxycyclohexyl)-2-norbornene.

Other objects and embodiments referring to alternative epoxy-cyclohexanes having an olefinic side chain, as the sole additional functional group and to alternative unsaturated compounds, will be found in the following further detailed description of this invention.

As hereinbefore set forth cycloalkenic derivatives of epoxycyclohexanes may be prepared by condensing an epoxycyclohexane containing an olefinic side chain, as the sole additional functional group, said group containing only carbon and hydrogen atoms, with an unsaturated conjugated compound such as alkadienes, cycloalkadienes, halo substituted alkadienes, or halo cycloalkadienes, to form condensation products which find a wide variety of uses in the chemical field. For purposes of this invention the term "cycloalkenic" as used hereinafter in the specification and appended claims will refer to both cycloalkenic and bicycloalkenic derivatives of epoxycyclohexanes, and in addition it is contemplated within the scope of this invention that the aforementioned term will embrace both unsubstituted and halo substituted cycloalkenic derivatives. Furthermore, the term "halo substituted" will refer to both mono- and polyhalo substituted compounds.

For example, the condensation product of cyclopentadiene and dipentene monoxide (1-methyl-1,2-epoxy-4-isopropenylcyclohexane), namely, 5-methyl-5-(4-methyl-3,4-epoxycyclohexyl)-2-norbornene may be used as an intermediate in the preparation of an insecticide, the final product which will possess insecticidal activity being prepared by halogenating, and particularly chlorinating, the aforesaid intermediate by any means known in the art such as treatment with chlorine, anhydrous hydrogen chloride, etc., at appropriate temperatures and pressures, said chlorinated product being especially effective against houseflies. It is also contemplated that the reaction product may be further condensed with hexachlorocyclopentadiene to prepare products which are useful per se as insecticides. In addition, if the unsaturated compound is halo substituted, and particularly polyhalo substituted to begin with, the Diels-Alder adduct may be useful as an insecticide without further treatment such as further halogenation. For example, the Diels-Alder condensation product of hexachlorocyclopentadiene and dipentene monoxide, namely, 1,2,3,4,7,7-hexachloro-5-methyl-5-(4-methyl-3,4-epoxycyclohexyl)-norbornene may be used per se as an insecticide, especially against houseflies. In addition, the Diels-Alder adduct of this invention may also be used as oxidation inhibitors or as intermediates in the preparation of resins, pharmaceuticals, plastics, etc.

The process of this invention in which the unsaturated compound comprising a conjugated diolefin such as an alkadiene, cycloalkadiene, halogenated alkadiene, or halogenated cycloalkadiene is condensed with the epoxycyclohexane containing an olefinic side chain as the sole additional functional group will be effected at a temperature in the range of from about atmospheric to about 300° C. or more and often preferably at a temperature in the range of from about 100° to about 250° C., the temperature depending upon the reactants which are to be condensed. Generally, the reaction will take place at atmospheric pressure; however, if higher temperatures are used when condensing a lower boiling diene with the epoxycyclohexane, superatmospheric pressures ranging from about 2 to about 100 atmospheres will be used, the amount of pressure being necessary to maintain at least a portion of the reactants in the liquid phase. In addition, if so desired, the reaction will take place in the presence of inert organic solvents including aromatic solvents such as benzene, toluene, o-, m- and p-xylene, ethyl benzene, etc.; alcohols such as methyl alcohol, ethyl alcohol, propyl alcohol, etc.; ethers such as dimethyl ether, diethyl ether, dipropyl ether, etc.; saturated aliphatic hydrocarbons such as pentane, hexane, heptane, etc.; or acetone, acetic acid, etc.

Unsaturated conjugated diolefinic compounds containing at least one halogen substituent which may be reacted with the epoxycyclohexane containing the olefinic side chain as the sole additional functional group, said group containing only carbon, hydrogen and halogen atoms, in the process of the present invention include straight-chain diolefins having the general formula:

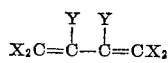

in which the X's are independently selected from the group consisting of hydrogen or halogen radicals having an atomic weight of from 35 to 127 (i.e. chlorine, bromine or iodine), at least 1 of the X's being halogen and Y is independently selected from the group consisting of alkyl, haloalkyl, halogen and hydrogen radicals, or polyhalo-cycloalkadienes having the general formula:

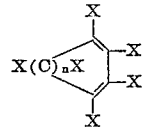

in which the X's have the same meaning as above and $n$ is 1 or 2. Examples of these compounds include haloalkadienes such as 1-chloro-1,3-butadiene,
1,3-dichloro-1,3-butadiene,
1-bromo-1,3-butadiene,
1,3-dibromo-1,3-butadiene,
1,3-diiodo-1,3-butadiene,
1,1,3-trichloro-1,3-butadiene,
1,1,3-tribromo-1,3-butadiene,
1-iodo-1,3-butadiene,
1,2-diiodo-1,3-butadiene,
1,1,3-triiodo-1,3-butadiene,
1,1,2-trichloro-1,3-butadiene,
1,1,2-tribromo-1,3-butadiene,
1,1,2-triiodo-1,3-butadiene,
1,1,4-trichloro-1,3-butadiene,
1,1,4-tribromo-1,3-butadiene,
1,1,4-triiodo-1,3-butadiene,
1,1,4,4,-tetrachloro-1,3-butadiene,
1,1,4,4-tetrabromo-1,3-butadiene,
1,1,4,4-tetraiodo-1,3-butadiene,
1,1,2,3-tetrachloro-1,3-butadiene,
1,1,2,3-tetrabromo-1,3-butadiene,
1,1,2,3-tetraiodo-1,3-butadiene,
1,1,2,3,4-pentachloro-1,3-butadiene,
1,1,2,3,4-pentabromo-1,3-butadiene,
1,1,2,3,4-pentaiodo-1,3-butadiene,
hexachloro-1,3-butadiene,
hexabromo-1,3-butadiene,
hexaiodo-1,3-butadiene,
1,3-dichloro-2-methyl-1,3-butadiene,
1,4-dichloro-2-methyl-1,3-butadiene,
1,1,4-tetrachloro-2-methyl-1,3-butadiene,
1,4-dichloro-2-chloromethyl-1,3-butadiene,
1,4-dichloro-2-dichloromethyl-1,3-butadiene,
1,1,4-trichloro-2-methyl-1,3-butadiene,
1,1,4,4-tetrachloro-2-methyl-1,3-butadiene,
1,1,4,4-tetrachloro-2-chloromethyl-1,3-butadiene,
1,3-dibromo-2-methyl-1,3-butadiene,
1,4-dibromo-2-methyl-1,3-butadiene,
1,1,4,4-tetrabromo-2-methyl-1,3-butadiene,
1,4-dibromo-2-bromomethyl-1,3-butadiene,
1,4-dibromo-2-dibromomethyl-1,3-butadiene,
1,1,4-tribromo-2-methyl-1,3-butadiene,
1,1,4,4-tetrabromo-2-methyl-1,3-butadiene,
1,1,4,4-tetrabromo-2-bromomethyl-1,3-butadiene,
1,3-diiodo-2-methyl-1,3-butadiene,
1,4-diiodo-2-methyl-1,3-butadiene,
1,1,4,4-tetraiodo-2-methyl-1,3-butadiene,
1,4-diiodo-2-iodomethyl-1,3-butadiene,
1,1,4-triiodo-2-methyl-1,3-butadiene,
1,1,4,4-tetraiodo-2-methyl-1,3-butadiene,
1,1,4,4-tetraiodo-2-iodomethyl-1,3-butadiene, etc.;

halocycloalkadienes such as halogenated 1,3-cyclopentadienes which for purposes of this invention will be designated as halogenated cyclopentadienes including 1-chlorocyclopentadiene,
1,2-dichlorocyclopentadiene,
1,2,3-trichlorocyclopentadiene,
1,2,3,4-tetrachlorocyclopentadiene,
1,2,3,4,5-pentachlorocyclopentadiene,
hexachlorocyclopentadiene,
1-bromocyclopentadiene,
1,2-dibromocyclopentadiene, 1,2,3-tribromocyclopentadiene,
1,2,3,4-tetrabromocyclopentadiene,
1,2,3,4,5-pentabromocyclopentadiene,
hexabromocyclopentadiene,
1-iodocyclopentadiene,
1,2-diiodocyclopentadiene,
1,2,3-triiodocyclopentadiene,
1,2,3,4-tetraiodocyclopentadiene,
1,2,3,4,5-pentaiodocyclopentadiene,
hexaiodocyclopentadiene, etc.

It is also contemplated within the scope of this invention that polyhalo substituted conjugated cyclohexadienes such as 1,2-dichloro-1,3-cyclohexadiene, 1,2,3-trichloro-1,3-cyclohexadiene, octachloro-1,3-cyclohexadiene, etc., 1,2-dibromo-1,3-cyclohexadiene, 1,2,3-tribromo-1,3-cyclohexadiene, octabromo-1,3-cyclohexadiene, 1,2-diiodo-1,3-cyclohexadiene, 1,2,3-triiodo - 1,3 - cyclohexadiene, octaiodo-1,3-cyclohexadiene, etc., may also be used. In addition, it is also contemplated that polyhaloalkadienes and polyhalocycloalkadienes which are used in this process may contain more than one species of halo substituents, such as, for example, 1,1-dichloro-3-bromo-1,3-butadiene,
1-chloro-3-bromo-1,3-butadiene,
1-iodo-3-chloro-1,3-butadiene,
2-bromo-3-chloro-1,3-butadiene,
1,4-dichloro-2-bromomethyl-1,3-butadiene,
1,4-dichloro-2-iodomethyl-1,3-butadiene,
1-chloro-2-bromocyclopentadiene,
1,2-dichloro-3-bromocyclopentadiene,
1,2-dichloro-5,5-dibromocyclopentadiene, etc., may be used although not necessarily with equivalent results.

Diolefinic conjugated hydrocarons containing only carbon and hydrogen atoms which may be reacted with the epoxycyclohexane containing an olefinic side chain as the sole additional functional group in the process of the present invention include straight-chain conjugated diolefins having the general formula:

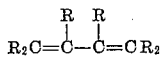

in which the R's are independently selected from the group consisting of alkyl or hydrogen radicals, at least one R of each of the doubly bonded carbon atoms being hydrogen; or conjugated cycloalkadienes having the general formula:

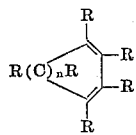

in which the R's are independently selected from the group consisting of hydrogen or alkyl radicals. Examples of these compounds include conjugated alkadienes such as 1,3-butadiene,
2-methyl-1,3-butadiene (isoprene),
2,3-dimethyl-1,3-butadiene,
1,3-pentadiene,
2-methyl-1,3-pentadiene,
3-methyl-1,3-pentadiene,
2,3-dimethyl-1,3-pentadiene,
2-ethyl-1,3-pentadiene,
3-ethyl-1,3-pentadiene,
2,4-hexadiene,
3-methyl-2,4-hexadiene,
3,4-dimethyl-2,4-hexadiene,
3-ethyl-2,4-hexadiene,
3,4-diethyl-2,4-hexadiene,
1,3-hexadiene,
2-methyl-3,4-hexadiene,
3-methyl-1,3-hexadiene,
2-ethyl-1,3-hexadiene,
3-ethyl-1,3-hexadiene,
2,3-diethyl-1,3-hexadiene,
2,4-heptadiene,
3-methyl-2,4-heptadiene,
4-methyl-2,4-heptadiene,
3,4-dimethyl-2,4-heptadiene,
3-ethyl-2,4-heptadiene,
4-ethyl-2,4-heptadiene,
3,4-diethyl-2,4-heptadiene,
1,3-heptadiene,
2-methyl-1,3-heptadiene,
3-methyl-1,3-heptadiene,
2,3-dimethyl-1,3-heptadiene,
2-ethyl-1,3-heptadiene,
3-ethyl-1,3-heptadiene,
2,3-diethyl-1,3-heptadiene, etc.;

cycloalkadienes and alkyl substituted cycloalkadienes such as 1,3-cyclopentadienes which for purposes of this invention will be designated as cyclopentadienes and include cyclopentadiene,
1-methylcyclopentadiene,
2-methylcyclopentadiene,
5-methylcyclopentadiene,
1,2-dimethylcyclopentadiene,
1,3-dimethylcyclopentadiene,
5,5-dimethylcyclopentadiene,
1,2,3-trimethylcyclopentadiene,
1,2,3,4-tetramethylcyclopentadiene,
hexamethylcyclopentadiene,
1-ethylcyclopentadiene,
2-ethylcyclopentadiene,
5-ethylcyclopentadiene,
1,2-diethylcyclopentadiene,
1,3-diethylcyclopentadiene,
5,5-diethylcyclopentadiene,
1,2,3-triethylcyclopentadiene,
1,2,3,4-tetraethylcyclopentadiene,
hexaethylcyclopentadiene, etc.

It is also contemplated within the scope of this invention that conjugated cyclohexenes such as 1,3-cyclohexadiene,
1-methyl-1,3-cyclohexadiene,
2-methyl-1,3-cyclohexadiene,
5-methyl-1,3-cyclohexadiene,
1,2-dimethyl-1,3-cyclohexadiene,
1,3-dimethyl-1,3-cyclohexadiene,
1,4-dimethyl-1,3-cyclohexadiene,
5,6-dimethyl-1,3-cyclohexadiene,
1,2,3-trimethyl-1,3-cyclohexadiene,
1,2,4-trimethyl-1,3-cyclohexadiene,
1,4,5-trimethyl-1,3-cyclohexadiene,
1,5,6-trimethyl-1,3-cyclohexadiene, etc., may also be used although not necessarily with equivalent results.

Epoxycyclohexanes containing an olefinic side chain of from 2 to about 7 carbon atoms as the sole additional functional group, said group containing only carbon and hydrogen atoms, which may be used in the process of this invention include 1,2-epoxy-3-vinylcyclohexane,
1,2-epoxy-4-vinyl-cyclohexane,
1,2-epoxy-3-allycyclohexane,
1,2-epoxy-4-allylcyclohexane,
1,2-epoxy-3-methallylcyclohexane,
1,2-epoxy-4-methallylcyclohexane,
1,2,-epoxy-3-crotonylcyclohexane,
1,2-epoxy-4-crotonylcyclohexane,
1,2-epoxy-3-pentenylcylohexane,
1,2-epoxy-4-pentenylcyclohexane,
1,2-epoxy-3-(1-methyl-3-pentenyl)cyclohexane,
1,2-epoxy-4-(1-methyl-4-pentenyl)cyclohexane, 1,2-epoxy-3-(2-methyl-4-pentenyl)cyclohexane,
1,2-epoxy-4-(2-methyl-4-pentenyl)cyclohexane,
1,2-epoxy-3-(1,2-dimethyl-4-pentenyl)cyclohexane,
1,2-epoxy-4-(1,2-dimethyl-4-pentenyl)cyclohexane,
1,2-epoxy-3-(2,3-dimethyl-4-pentenyl)cyclohexane,
1,2-epoxy-4-(2,3-dimethyl-4-pentenyl)cyclohexane,
1,2-epoxy-3-(2,3-dimethyl-4-pentenyl)cyclohexane,
1,2-epoxy-4-(1-methyl-3-pentenyl)cyclohexane,
1,2-epoxy-3-(2-methyl-3-pentenyl)-cyclohexane,
1,2-epoxy-4-(2-methyl-3-pentenyl)cyclohexane,
1,2-epoxy-3-(3-methyl-3-pentenyl)cyclohexane,
1,2-epoxy-4-(3-methyl-3-pentenyl)cyclohexane,
1,2-epoxy-3-(1,2-dimethyl-3-pentenyl)cyclohexane,
1,2-epoxy-4-(1,2-dimethyl-3-pentenyl)cyclohexane,
1,2-epoxy-3-(2,3-dimethyl-3-pentenyl)cyclohexane,
1,2-epoxy-4-(2,3-dimethyl-3-pentenyl)cyclohexane,
1,2-epoxy-3-(1-methyl-2-pentenyl)cyclohexane,
1,2-epoxy-4-(1-methyl-2-pentenyl)cyclohexane,
1,2-epoxy-3-(2-methyl-2-pentenyl)cyclohexane,
1,2-epoxy-4-(2-methyl-2-pentenyl)cyclohexane,
1,2-epoxy-3-(3-methyl-2-pentenyl)cyclohexane,
1,2-epoxy-4-(3-methyl-2-pentenyl)cyclohexane,
1,2-epoxy-3-(1,2-dimethyl-2-pentenyl)cyclohexane,
1,2-epoxy-4-(1,2-dimethyl-2-pentenyl)cyclohexane,
1,2-epoxy-3-(2,3-dimethyl-2-pentenyl)cyclohexane,
1,2-epoxy-4-(2,3-dimethyl-2-pentenyl)cyclohexane,
1,2-epoxy-3-(3-hexenyl)cyclohexane,
1,2-epoxy-4-(3-hexenyl)cyclohexane,
1,2-epoxy-3-(4-hexenyl)cyclohexane,
1,2-epoxy-4-(4-hexenyl)cyclohexane,
1,2-epoxy-3-(5-hexenyl)cyclohexane,
1,2-epoxy-4-(5-hexenyl)cyclohexane,
1,2-epoxy-3-(1-methyl-3-hexenyl)cyclohexane,
1,2-epoxy-4-(1-methyl-3-hexenyl)cyclohexane,
1,2-epoxy-3-(2-methyl-3-hexenyl)cyclohexane,
1,2-epoxy-4-(2-methyl-3-hexenyl)cyclohexane,
1,2-epoxy-3-(3-methyl-3-hexenyl)cyclohexane,
1,2-epoxy-4-(3-methyl-3-hexenyl)cyclohexane,
1,2-epoxy-3-(4-methyl-3-hexenyl)cyclohexane,
1,2-epoxy-4-(4-methyl-3-hexenyl)cyclohexane,
1,2-epoxy-3-(5-methyl-3-hexenyl)cyclohexane,
1,2-epoxy-4-(5-methyl-3-hexenyl)cyclohexane,
1,2-epoxy-3-(1-methyl-4-hexenyl)cyclohexane,
1,2-epoxy-4-(1-methyl-4-hexenyl)cyclohexane,
1,2-epoxy-3-(2-methyl-4-hexenyl)cyclohexane,
1,2-epoxy-4-(2-methyl-4-hexenyl)cyclohexane,
1,2-epoxy-3-(3-methyl-4-hexenyl)cyclohexane,
1,2-epoxy-4-(3-methyl-4-hexenyl)cyclohexane,
1,2-epoxy-3-(4-methyl-4-hexenyl)cyclohexane,
1,2-epoxy-4-(4-methyl-4-hexenyl)cyclohexane,
1,2-epoxy-3-(5-methyl-4-hexenyl)cyclohexane,
1,2-epoxy-4-(5-methyl-4-hexenyl)cyclohexane,
1,2-epoxy-3-(1-methyl-5-hexenyl)cyclohexane,
1,2-epoxy-4-(1-methyl-5-hexenyl)cyclohexane,
1,2-epoxy-3-(2-methyl-5-hexenyl)cyclohexane,
1,2-epoxy-4-(2-methyl-5-hexenyl)cyclohexane,
1,2-epoxy-3-(3-methyl-5-hexenyl)cyclohexane,
1,2-epoxy-4-(3-methyl-5-hexenyl)cyclohexane,
1,2-epoxy-3-(4-methyl-5-hexenyl)cyclohexane,
1,2-epoxy-4-(4-methyl-5-hexenyl)cyclohexane,
1,2-epoxy-3-(5-methyl-5-hexenyl)cyclohexane,
1,2-epoxy-4-(5-methyl-5-hexenyl)cyclohexane,
1,2-epoxy-3-(1-heptenyl)cyclohexane,
1,2-epoxy-4-(1-heptenyl)cyclohexane,
1,2-epoxy-3-(2-heptenyl)cyclohexane,
1,2-epoxy-4-(2-heptenyl)cyclohexane,
1,2-epoxy-3-(3-heptenyl)cyclohexane,
1,2-epoxy-4-(3-heptenyl)cyclohexane,
1,2-epoxy-3-(4-heptenyl)cyclohexane,
1,2-epoxy-4-(4-heptenyl)cyclohexane,
1,2-epoxy-3-(5-heptenyl)cyclohexane,
1,2-epoxy-4-(5-heptenyl)cyclohexane,
1,2-epoxy-3-(1-methyl-1-heptenyl)cyclohexane,
1,2-epoxy-4-(1-methyl-1-heptenyl)cyclohexane,
1,2-epoxy-3-(2-methyl-1-heptenyl)cyclohexane,
1,2-epoxy-4-(2-methyl-1-heptenyl)cyclohexane,
1,2-epoxy-3-(3-methyl-1-heptenyl)cyclohexane,
1,2-epoxy-4-(3-methyl-1-heptenyl)cyclohexane,
1,2-epoxy-3-(4-methyl-1-heptenyl)cyclohexane,
1,2-epoxy-4-(4-methyl-1-heptenyl)cyclohexane,
1,2-epoxy-3-(5-methyl-1-heptenyl)cyclohexane,
1,2-epoxy-4-(5-methyl-1-heptenyl)cyclohexane,
1,2-epoxy-3-(6-methyl-1-heptenyl)cyclohexane,
1,2-epoxy-4-(6-methyl-1-heptenyl)cyclohexane,
1,2-epoxy-3-(1-methyl-2-heptenyl)cyclohexane,
1,2-epoxy-4-(1-methyl-2-heptenyl)cyclohexane,
1,2-epoxy-3-(2-methyl-2-heptenyl)cyclohexane,
1,2-epoxy-4-(3-methyl-2-heptenyl)cyclohexane,
1,2-epoxy-3-(4-methyl-2-heptenyl)cyclohexane,
1,2-epoxy-4-(4-methyl-2-heptenyl)cyclohexane,
1,2-epoxy-3-(5-methyl-2-heptenyl)cyclohexane,
1,2-epoxy-4-(5-methyl-2-heptenyl)cyclohexane,
1,2-epoxy-3-(6-methyl-2-heptenyl)cyclohexane,
1,2-epoxy-4-(6-methyl-2-heptenyl)cyclohexane,
1,2-epoxy-3-(1-methyl-3-heptenyl)cyclohexane,
1,2-epoxy-4-(1-methyl-3-heptenyl)cyclohexane,
1,2-epoxy-3-(2-methyl-3-heptenyl)cyclohexane,
1,2-epoxy-4-(2-methyl-3-heptenyl)cyclohexane,
1,2-epoxy-3-(3-methyl-3-heptenyl)cyclohexane,
1,2-epoxy-4-(3-methyl-3-heptenyl)cyclohexane,
1,2-epoxy-3-(4-methyl-3-heptenyl)cyclohexane,
1,2-epoxy-4-(4-methyl-3-heptenyl)cyclohexane,
1,2-epoxy-3-(5-methyl-3-heptenyl)cyclohexane,
1,2-epoxy-4-(5-methyl-3-heptenyl)cyclohexane,
1,2-epoxy-3-(6-methyl-3-heptenyl)cyclohexane,
1,2-epoxy-4-(6-methyl-3-heptenyl)cyclohexane,
1,2-epoxy-3-(1-methyl-4-heptenyl)cyclohexane,
1,2-epoxy-4-(2-methyl-4-heptenyl)cyclohexane,
1,2-epoxy-3-(3-methyl-4-heptenyl)cyclohexane,
1,2-epoxy-4-(3-methyl-4-heptenyl)cyclohexane,
1,2-epoxy-3-(4-methyl-4-heptenyl)cyclohexane,
1,2-epoxy-4-(4-methyl-4-heptenyl)cyclohexane,
1,2-epoxy-3-(5-methyl-4-heptenyl)cyclohexane,
1,2-epoxy-4-(5-methyl-4-heptenyl)cyclohexane,
1,2-epoxy-3-(6-methyl-4-heptenyl)cyclohexane,
1,2-epoxy-4-(6-methyl-4-heptenyl)cyclohexane,
1,2-epoxy-3-(1-methyl-5-heptenyl)cyclohexane,
1,2-epoxy-4-(1-methyl-5-heptenyl)cyclohexane,
1,2-epoxy-3-(2-methyl-5-heptenyl)cyclohexane,
1,2-epoxy-4-(2-methyl-5-heptenyl)cyclohexane,
1,2-epoxy-3-(3-methyl-5-heptenyl)cyclohexane,
1,2-epoxy-4-(3-methyl-5-heptenyl)cyclohexane,
1,2-epoxy-3-(4-methyl-5-heptenyl)cyclohexane,
1,2-epoxy-4-(4-methyl-5-heptenyl)cyclohexane,
1,2-epoxy-3-(5-methyl-5-heptenyl)cyclohexane,
1,2-epoxy-4-(5-methyl-5-heptenyl)cyclohexane,
1,2-epoxy-3-(6-methyl-5-heptenyl)cyclohexane,
1,2-epoxy-4-(6-methyl-5-heptenyl)cyclohexane,
1,2-epoxy-3-(1-methyl-6-heptenyl)cyclohexane,
1,2-epoxy-4-(1-methyl-6-heptenyl)cyclohexane,
1,2-epoxy-3-(2-methyl-6-heptenyl)cyclohexane,
1,2-epoxy-4-(2-methyl-6-heptenyl)cyclohexane,
1,2-epoxy-3-(3-methyl-6-heptenyl)cyclohexane,
1,2-epoxy-4-(3-methyl-6-heptenyl)cyclohexane,
1,2-epoxy-3-(4-methyl-5-heptenyl)cyclohexane,
1,2-epoxy-4-(4-methyl-5-heptenyl)cyclohexane,
1,2-epoxy-3-(5-methyl-6-heptenyl)cyclohexane,
1,2-epoxy-4-(5-methyl-6-heptenyl)cyclohexane,
1,2-epoxy-3-(6-methyl-6-heptenyl)cyclohexane,
1,2-epoxy-4-(6-methyl-7-heptenyl)cyclohexane, etc.,
1-methyl-1,2-epoxy-4-isopropenylcyclohexane (dipentene monoxide),
1-ethyl-1,2-epoxy-4-isopropenylcyclohexane,
1-methyl-1,2-epoxy-4-vinylcyclohexane,
1,2-epoxy-2-ethyl-4-vinylcyclohexane,
1,2-epoxy-4-vinyl-5-methylcyclohexane,
1,2-epoxy-4-vinyl-6-ethylcyclohexane,
1,2-epoxy-3-methyl-4-vinylcyclohexane,
1,2-epoxy-3-ethyl-4-vinylcyclohexane, 1,2-epoxy-3-propyl-4-vinylcyclohexane,
1,2-epoxy-1-methyl-4-crotonylcyclohexane,
1,2-epoxy-1-ethyl-4-crotonylcyclohexane,
1,2-epoxy-3-methyl-4-crotonylcyclohexane,
1,2-epoxy-3-ethyl-4-crotonylcyclohexane,
1,2-epoxy-3,5-dimethyl-4-vinylcyclohexane,
1,2-epoxy-3,5-dimethyl-4-allylcyclohexane,
1,2-epoxy-3,6-dimethyl-4-vinylcyclohexane,
1,2-epoxy3,6-diethyl-4-allylcyclohexane, etc.

It is to be understood that the aforementioned conjugated alkadienes, cycloalkadienes, halo substituted alkadienes and cycloalkadienes, and the epoxycyclohexanes containing an olefinic side chain as the sole additional functional group are only representatives of the class of compounds which may be used and that this invention is not necessarily limited thereto.

One example of the condensation reaction of the present process may be illustrated by the following equations in which dipentene monoxide is reacted with 1,3-dichloro-1,3-butadiene and hexachlorocyclopentadiene respectively:

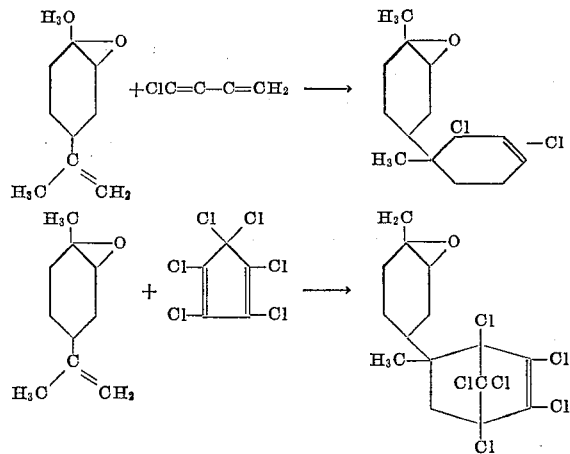

Another example of the condensation reaction of the present process may be illustrated by the following equations in which 1,2-epoxy-4-vinyl-cyclohexane is reacted with 2-methyl-1,3-butadiene (isoprene) and cyclopentadiene respectively:

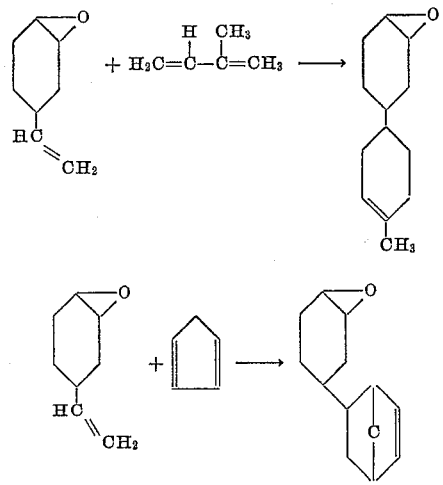

to yield 1-methyl-4-(3,4-epoxycyclohexyl)-1-cyclohexene- and 5-(3,4-epoxycyclohexyl)-2-norbornene respectively.

The physical properties of the present halocycloalkenic derivatives of epoxycyclohexanes and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as surface active agent, to the mixture of components. The latter solvents and dispersements may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of the present invention may be effected in any suitable manner and may comprise either a batch or continuous type operation. For example, when a batch type operation is used, a quantity of the starting materials comprising the epoxycyclohexane containing an olefinic side chain as the sole additional functional group, said group containing only carbon and hydrogen atoms, and, if so desired, an inert organic solvent is placed in a condensation apparatus provided with heating and mixing means. The apparatus is then adjusted to the desired temperature and the conjugated olefin such as alkadiene or cycloalkadiene containing only carbon and hydrogen atoms or a haloalkadiene or halocycloalkadiene containing only hydrogen, carbon, and halogen atoms is added thereto at a predetermined rate, the temperature of the flash being maintained at the desired level for a predetermined residence time. At the end of this time the apparatus and contents thereof are allowed to cool to room temperature and the desired reaction product is separated from unreacted starting materials by conventional means such as, for example, fractional distillation, crystallization, etc. Alternatively, the reactants and solvent, if any, may be first admixed and then heated to the desired reaction temperature.

Another method of effecting the condensation reaction of the present invention is by a continuous type operation. In this type of operation the starting materials comprising the epoxycyclohexane containing an olefinic side chain as the sole additional functional group and the alkadiene, cycloalkadiene, haloalkadiene or halocycloalkadiene are continuously charged to a reactor which is maintained at the proper operating conditions of temperature and pressure. The reactor may comprise an unpacked vessel or coil or may be lined with an adsorbent packing material such as fire brick, alumina, dehydrated bauxite, or the like. If so desired, inert organic solvents of the type hereinbefore set forth may be added through a separate line or admixed with one or the other of the starting materials prior to entry into said reactor and charged thereto in a single line. The reaction product is continuously withdrawn from the reactor effluent, and purified by conventional means hereinbefore set forth, while the reaction starting materials are separated and recharged to the reactor as a portion of the feed stock.

Examples of reaction products which are prepared according to the present process comprise compounds having the generic formula:

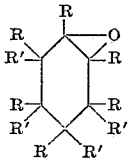

in which the R's are selected from the group consisting of hydrogen and alkyl radicals and the R″'s are selected from the group consisting of R and cyclo radicals having the generic formulae:

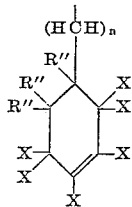

and

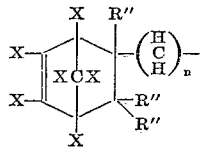

in which the X's are selected from the group consisting of hydrogen and halo radicals, the R‴'s are selected from the group consisting of hydrogen and alkyl radicals, and $n$ is an integer of from 0 to about 5, at least one R' being selected from the cyclo radicals, include 1,2-dichloro-5-methyl-5-(4-methyl-3,4-epoxycyclohexyl)-2-norbornene,
1,3-dichloro-5-methyl-5-(4-methyl-3,4-epoxycyclohexyl)-2-norbornene,
1,4-dichloro-5-methyl-5-(4-methyl-3,4-epoxycyclohexyl)-2-norbornene,
1,2,3-trichloro-5-methyl-5-(4-methyl-3,4-epoxycyclohexyl)-2-norbornene,
1,2,3,5-tetrachloro-5-methyl-5-(4-methyl-3,4-epoxycyclohexyl)-2-norbornene,
1,2,3,4,7,7-hexachloro-5-methyl-5-(4-methyl-3,4-epoxycyclohexyl)-2-norbornene,
1,2-dibromo-5-methyl-5-(4-methyl-3,4-epoxycyclohexyl)-2-norbornene,
1,3-dibromo-5-methyl-5-(4-methyl-3,4-epoxycyclohexyl)-2-norbornene,
1,4-dibromo-5-methyl-5-(4-methyl-3,4-epoxycyclohexyl)-2-norbornene,
1,2,3-tribromo-5-methyl-5-(4-methyl-3,4-epoxycyclohexyl)-2-norbornene,
1,2,3,4-tetrabromo-5-methyl-5-(4-methyl-3,4-epoxycyclohexyl)-2-norbornene,
1,2,3,4,7,7-hexabromo-5-methyl-5-(4-methyl-3,4-epoxycyclohexyl)-2-norbornene,
1,2-diiodo-5-methyl-5-(4-methyl-3,4-epoxycyclohexyl)-2-norbornene,
1,3-diiodo-5-methyl-5-(4-methyl-3,4-epoxycyclohexyl)-2-norbornene,
1,4-diiodo-5-methyl-5-(4-methyl-3,4-epoxycyclohexyl)-2-norborne,
1,2,3-diiodo-5-methyl-5-(4-methyl-3,4-epoxycyclohexyl)-2-norbornene,
1,2,3,4-diiodo-5-methyl-5-(4-methyl-3,4-epoxycyclohexyl)-2-norbornene,
1,2,3,4,7,7-hexaiodo-5-methyl-5-(4-methyl-3,4-epoxycyclohexyl)-2-norbornene,
1,2-dichloro-4-methyl-4-(4-methyl-3,4-epoxycyclohexyl)-1-cyclohexene,
3,6-dichloro-4-methyl-4-(4-methyl-3,4-epoxycyclohexyl)-1-cyclohexene,
2,3-dichloro-4-methyl-4-(4-methyl-3,4-epoxycyclohexyl)-1-cyclohexene,
1,2,3-trichloro-4-methyl-4-(4-methyl-3,4-epoxycyclohexyl)-1-cyclohexene,
1,2,3,3-tetrachloro-4-methyl-4-(4-methyl-3,4-epoxycyclohexyl)-1-cyclohexene,
1,2,3,3,6,6-hexachloro-4-methyl-4-(4-methyl-3,4-epoxycyclohexyl)-1-cyclohexene,
1,3-dibromo-4-methyl-4-(4-methyl-3,4-epoxycyclohexyl)-1-cyclohexene,
3,6-dibromo-4-methyl-4-(4-methyl-3,4-epoxycyclohexyl)-1-cyclohexene,
2,3-dibromo-4-methyl-4-(4-methyl-3,4-epoxycyclohexyl)-1-cyclohexene,
1,2,3-tribromo-4-methyl-4-(4-methyl-3,4-epoxycyclohexyl)-1-cyclohexene,
1,2,3,3-tetrabromo-4-methyl-4-(4-methyl-3,4-epoxycyclohexyl)-1-cyclohexene,
1,2,3,3,6,6-hexabromo-4-methyl-4-(4-methyl-3,4-epoxycyclohexyl)-1-cyclohexene,
1,3-diiodo-4-methyl-4-(4-methyl-3,4-epoxycyclohexyl)-1-cyclohexene,
3,6-diiodo-4-methyl-4-(4-methyl-3,4-epoxycyclohexyl)-1-cyclohexene,
2,3-diiodo-4-methyl-4-(4-methyl-3,4-epoxycyclohexyl)-1-cyclohexene,
1,2,3-triiodo-4-methyl-4-(4-methyl-3,4-epoxycyclohexyl)-1-cyclohexene,
1,2,3,3-tetraiodo-4-methyl-4-(4-methyl-3,4-epoxycyclohexyl)-1-cyclohexene,
1,2,3,3,6,6-hexaiodo-4-methyl-4-(4-methyl-3,4-epoxycyclohexyl)-1-cyclohexene, etc.,
5-methyl-5-(4-methyl-3,4-epoxycyclohexyl)-2-norbornene,
5-(4-methyl-3,4-epoxycyclohexyl)-2-norbornene,
5-(4-ethyl-3,4-epoxycyclohexyl)-2-norbornene,
5-(3,4-epoxycyclohexyl)-2-norbornene,
4-methyl-4-(4-methyl-3,4-epoxycyclohexyl)-1-cyclohexene,
4-(4-methyl-3,4-epoxycyclohexyl)-1-cyclohexene,
4-(4-ethyl-3,4-epoxycyclohexyl)-1-cyclohexene,
4-(3,4-epoxycyclohexyl)-1-cyclohexene, etc.

The following examples are given to illustrate the process of the present invention, which, however, are not intended to limit the generally broad scope of the present invention in strict accordance therewith.

Example I

A mixture of 54 g. (0.2 mole) of hexachlorocyclopentadiene and 25 g. (0.2 mole) of 1,2-epoxy-3-vinylcyclohexane dissolved in 50 g. of toluene was refluxed at a temperature of about 110° C. for a period of about 6 hours during which time the inert solvent, toluene, was distilled over until the reaction temperature reached 171° C. The reaction mixture was maintained at this temperature for an additional 21 hours after which time the vessel and contents thereof were allowed to cool to room temperature. The reaction product was recovered, washed, dried and distilled under reduced pressure. The cut boiling in a range of from 183.5° to 188° C. at 0.8 mm. pressure (393°–395° C. at 760 mm. pressure) was separated and recovered, this product had a refractive index $n_D^{20}$ of 1.5673. The cut which comprised 1,2,3,4,7,7-hexachloro-5-(3,4-epoxycyclohexyl)-2-norbornene was analyzed with the following results.

Found: C, 39.34; H, 3.20; Cl, 53.31. Calcd. for $C_{13}H_{12}Cl_6O_1$: C, 39.33; H, 3.05; Cl, 53.59.

Example II

A mixture of 27 g. (0.1 mole) of hexachlorocyclopentadiene and 15 g. (0.1 mole) of dipentene monoxide (1-methyl-1,2-epoxy-4-isopropenylcyclohexane) dissolved in 50 g. of toluene is refluxed at a temperature of about 110° C. for a period of about 6 hours during which time the inert solvent, toluene, is distilled over until the reaction temperature reaches approximately 200° C. The reaction mixture is maintained at this temperature for an additional 2 hours, after which the vessel and contents thereof are allowed to cool to room temperature and the reaction product is recovered, washed, dried and distilled under reduced pressure. The desired product, comprising 1,2,3,4,7,7 - hexachloro - 5 - methyl - 5 - (4-methyl-3,4-epoxycyclohexyl)-2-norbornene is separated therefrom.

Example III

A solution of 15 g. (0.1 mole) of dipentene monoxide and 32 g. (0.1 mole) of 1,3-dichloro-1,3-butadiene in 50 g. of xylene is heated under reflux for a period of about 5 hours during which time the xylene is distilled over until the reaction temperature reached a maximum of about 225° C. At the end of this time the flask and contents thereof are allowed to cool to room temperature and the reaction product is recovered, washed, dried and subjected to fractional distillation under reduced pressure. The desired product, comprising 1,3-dichloro-4-methyl-4-(4-methyl - 3,4 - epoxycyclohexyl)-1-cyclohexene is separated therefrom.

Example IV

A solution of 15 g. of dipentene monoxide and 15 g. of 1,3,4-trichloro-1,3-butadiene in 50 g. of toluene is heated under reflux for about 5 hours, after which the product is recovered and treated as described for the products of Examples I and II above. The desired product, comprising 1,2,5 - trichloro - 4 - methyl - 4 - (4-methyl-3,4-epoxycyclohexyl)-1-cyclohexene is recovered therefrom.

Example V

A solution of 15 g. of dipentene monoxide and 14 g. of 1,3-dichloro-2-methyl-1,3-butadiene (1,3-dichloroisoprene) in 50 g. of xylene is treated as described in Examples I to III above. The desired product, comprising 2,6-dichloro-1,5-dimethyl-5-(4-methyl-3,4-epoxycyclohexyl) - 1 - cyclohexene is recovered by fractional distillation under reduced pressure.

Example VI

A solution of 15 g. (0.1 mole) of dipentene monoxide and 18.5 g. (0.1 mole) of 1,2,3,4-tetrachloro-1,3-butadiene in 50 g. of toluene is treated as described in Examples I to IV above. The desired product comprising 1,2,3,5-tetrachloro - 4 - methyl-4-(4-methyl - 3,4 - epoxycyclohexyl)-cyclohexane is recovered by fractional distillation under reduced pressure.

Example VII

An insecticidal solution is prepared by dissolving 1 g. of 1,2,3,4,7,7 - hexachloro - 5 - methyl-5-(4-methyl-3,4-epoxycyclohexyl)-2-norbornene in 2 cc. of benzene and adding 100 cc. of water using Triton X–100 as an emulsifying agent. This solution is sprayed into a cage containing common houseflies and causes a 100% knock-down. Similar tests with compounds prepared according to Examples I and III to VI will show similar results.

Example VIII

A mixture of 5.4 g. (0.1 mole) of 1,3-butadiene and 12.3 g. (0.1 mole) of 1,2-epoxy-4-vinylcyclohexane dissolved in 50 g. of toluene is refluxed at a temperature of about 100° C. for a period of about 6 hours during which time the inert solvent, toluene, is distilled over until the reaction temperature reaches approximately 200° C. The reaction mixture is maintained at this temperature for an additional two hours after which time the vessel and contents thereof are allowed to cool to room temperature and the reaction product is recovered, washed, dried and subjected to fractional distillation under reduced pressure. The desired product, comprising 4-(3,4-epoxycyclohexyl)-1-cyclohexene is separated therefrom.

Example IX

A solution of 12.3 g. (0.1 mole) of 1,2-epoxy-4-vinylcyclohexane and 6.5 g. (0.1 mole) of cyclopentadiene in 50 g. of xylene is heated under reflux for a period of about 5 hours during which time the xylene is distilled over until the reaction temperature reaches a maximum of about 225° C. At the end of this time the flask and contents thereof are allowed to cool to room temperature and the reaction product is recovered, washed, dried and subjected to fractional distillation under reduced pressure. The desired product, comprising 5-(3,4-epoxycyclohexyl)-2-norbornene is separated and recovered therefrom.

Example X

A solution of 15 g. of 1-methyl-1,2-epoxy-4-isopropenylcyclohexane (dipentene monoxide) and 5.5 g. of 1,3-butadiene in 50 g. of toluene is heated under reflux for about 5 hours, after which time the product is recovered and treated as described for the products of Examples I and II above. The desired product, comprising 4-methyl-4-(4-methyl-3,4-epoxycyclohexyl)-1-cyclohexene is recovered therefrom.

Example XI

A solution of 15 g. of dipentene monoxide and 6.5 g. of cyclopentadiene in 50 g. of xylene is treated as described in Examples I to III above. The desired product, comprising 5-methyl-5-(4-methyl-3,4-epoxycyclohexyl)-2-norbornene is recovered by fractional distillation under reduced pressure.

Example XII

A solution of 15 g. of dipentene monoxide and 7 g. of 2-methyl-1,3-butadiene (isoprene) in 50 g. of benzene is subjected to the same treatment as described in the above examples. The desired product, comprising 1,4-dimethyl-4-(4-methyl-3,4-epoxycyclohexyl)-1-cyclohexene is recovered by fractional distillation under reduced pressure.

Example XIII

Equimolecular proportions of the compound prepared in Example VII above, namely, 4-(3,4-epoxycyclohexyl)-1-cyclohexene and hexachlorocyclopentadiene are condensed to form the desired product. An insecticidal solution is prepared by dissolving 1 g. of this product in 2 cc. of benzene and adding 100 cc. of water using Triton X–100 as an emulsifying agent. This solution is sprayed into a cage containing common houseflies and causes a 100% knock-down. Similar tests with other compounds prepared according to Examples IX to XII and thereafter chlorinated or condensed with hexachlorocyclopentadiene will show similar results.

I claim as my invention:

1. A process which comprises condensing 1,2-epoxycyclohexane containing, as a sole additional functional group, olefinic side chain of from 2 to 7 carbon atoms attached to a carbon atom of the cyclohexane ring, said group consisting of carbon and hydrogen atoms, with an unsaturated compound selected from the group consisting of conjugated butadiene, cyclopentadiene and cyclohexadiene and chlorinated, brominated and iodated conjugated butadiene, cyclopentadiene and cyclohexadiene, at a temperature in the range of from about atmospheric to about 300° C. and at a pressure in the range of from about atmospheric to about 100 atmospheres.

2. A process which comprises condensing 1,2-epoxycyclohexane containing, as the sole additional functional group, olefinic side chain of from 2 to 7 carbon atoms attached to a carbon atom of the cyclohexane ring, said group consisting of carbon and hydrogen atoms, with a chlorinated conjugated butadiene consisting of carbon, hydrogen and chlorine atoms, at a temperature in the range of from about atmospheric to about 300° C. and at a pressure in the range of from about atmospheric to about 100 atmospheres.

3. A process which comprises condensing 1,2-epoxycyclohexane containing, as the sole additional functional group, olefinic side chain of from 2 to 7 carbon atoms attached to a carbon atom of the cyclohexane ring, said group consisting of carbon and hydrogen atoms, with a chlorinated conjugated cyclopentadiene consisting of carbon, hydrogen and chlorine atoms, at a temperature in the range of from about atmospheric to about 300° C. and at a pressure in the range of from about atmospheric to about 100 atmospheres.

4. A process which comprises condensing 1,2-epoxycyclohexane containing, as the sole additional functional group, an olefinic side chain of from 2 to 7 carbon atoms attached to a carbon atom of the cyclohexane ring, said group consisting of carbon and hydrogen atoms, with a conjugated butadiene consisting of carbon and hydrogen atoms at a temperature in the range of from about atmospheric to about 300° C. and at a pressure in the range of from about atmospheric to about 100 atmospheres.

5. A process which comprises condensing 1,2-epoxycyclohexane containing, as the sole additional functional group, an olefinic side chain of from 2 to 7 carbon atoms attached to a carbon atom of the cyclohexane ring, said group consisting of carbon and hydrogen atoms, with a conjugated cyclopentadiene consisting of carbon and hydrogen atoms at a temperature in the range of from about atmospheric to about 300° C. and at a pressure in the range of from about atmospheric to about 100 atmospheres.

6. The process of claim 1 in which said epoxycyclohexane is dipentene monoxide.

7. The process of claim 1 in which said unsaturated compound is hexachlorocyclopentadiene.

8. The process of claim 1 in which said unsaturated compound is 1,3-dichloro-1,3-butadiene.

9. The process of claim 1 in which said unsaturated compound is 1,3,4-trichloro-1,3-butadiene.

10. The process of claim 1 in which said unsaturated compound is 1,3-dichloro-2-methyl-1,3-butadiene.

11. The process of claim 1 in which said unsaturated compound is 1,2,3,4-tetrachloro-1,3-butadiene.

12. The process of claim 1 in which said unsaturated compound is 1,3-butadiene.

13. The process of claim 1 in which said unsaturated compound is cyclopentadiene.

14. A process for the preparation of 1,2,3,4,7,7-hexachloro-5-methyl-5-(4-methyl - 3,4 - epoxycyclohexyl) - 2-norbornene which comprises condensing dipentene monoxide with hexachlorocyclopentadiene at a temperature in the range of from about atmospheric to about 300° C. and at a pressure in the range of from about 1 to about 100 atmospheres.

15. A process for the preparation of 1,3-dichloro-4-methyl-4-(4-methyl - 3,4 - epoxycyclohexyl)-1-cyclohexene which comprises condensing dipentene monoxide with 1,3-dichloro-1,3-butadiene at a temperature in the range of from about atmospheric to about 300° C. and at a pressure in the range of from about 1 to about 100 atmospheres.

16. A process for the preparation of 1,2,5-trichloro-4-methyl-4-(4-methyl - 3,4 - epoxycyclohexyl)-1-cyclohexene which comprises condensing dipentene monoxide with 1,3,4-trichloro-1,3-butadiene at a temperature in the range of from about atmospheric to about 300° C. and at a pressure in the range of from about 1 to about 100 atmospheres.

17. A process for the preparation of 2,6-dichloro-1,5-dimethyl - 5 - (4 - methyl - 3,4 - epoxycyclohexyl) - 1 - cyclohexene which comprises condensing dipentene monoxide with 1,3-dichloro-2-methyl-1,3-butadiene at a temperature in the range of from about atmospheric to about 300° C. and at a pressure in the range of from about 1 to about 100 atmospheres.

18. A process for the preparation of 1,2,3,5-tetrachloro-4 - methyl - 4 - (4 - methyl - 3,4 - epoxycyclohexyl)cyclohexene which comprises condensing dipentene monoxide with 1,2,3,4-tetrachloro-1,3-butadiene at a temperature in the range of from about atmospheric to about 300° C. and at a pressure in the range of from about 1 to about 100 atmospheres.

19. A process which comprises condensing 1,2-epoxy-4-vinylcyclohexane with 1,3-butadiene at a temperature in the range of from about atmospheric to about 300° C. and at a pressure in the range of from about 1 to about 100 atmospheres, to form 4-(3,4-epoxycyclohexyl)-1-cyclohexene.

20. A process which comprises condensing 1,2-epoxy-4-vinylcyclohexane with cyclopentadiene at a temperature in the range of from about atmospheric to about 300° C. and at a pressure in the range of from about 1 to about 100 atmospheres, to form 5-(3,4-epoxycyclohexyl)-2-norbornene.

21. A process which comprises condensing dipentene monoxide with 1,3-butadiene at a temperature in the range of from about atmospheric to about 300° C. and at a pressure in the range of from about 1 to about 100 atmospheres, to form 4-methyl-4-(4-methyl-3,4-epoxycyclohexyl)-1-cyclohexene.

22. A process which comprises condensing dipentene monoxide with cyclopentadiene at a temperature in the range of from about atmospheric to about 300° C. and at a pressure in the range of from about 1 to about 100 atmospheres to form 5-methyl-5-(4-methyl-3,4-epoxycyclohexyl)-2-norbornene.

23. A process which comprises condensing dipentene monoxide with 2-methyl-1,3-butadiene at a temperature in the range of from about atmospheric to about 300° C. and at a pressure in the range of from about 1 to about 100 atmospheres, to form 1,4-dimethyl-4-(4-methyl-3,4-epoxycyclohexyl)-1-cyclohexene.

24. A compound of the formula:

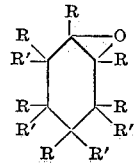

in which the R's are selected from the group consisting of hydrogen and alkyl radicals and the R"'s are selected form the group consisting of R and cyclo radicals of the formulae:

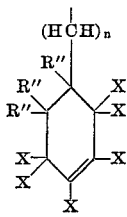

and

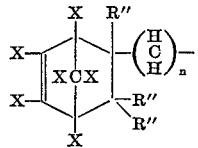

in which the X's are selected from the group consisting of hydrogen, chlorine, bromine and iodine, the R'''s are selected from the group consisting of hydrogen and alkyl radicals, and *n* is an integer of from 0 to 5, at least one R' being selected from the cyclo radicals.

25. 1,2,3,4,7,7 - hexachloro - 5 - methyl - 5 - (4 - methyl-3,4-epoxycyclohexyl)-2-norbornene.
26. 1,3 - dichloro - 4 - methyl - 4 - (4 - methyl - 3,4-epoxycyclohexyl)-1-cyclohexene.
27. 1,2,5 - trichloro - 4 - methyl - 4 - (4 - methyl - 3,4-epoxycyclohexyl)-1-cyclohexene.
28. 2,6 - dichloro - 1,5 - dimethyl - 5 - (4 - methyl - 3,4-epoxycyclohexyl)-1-cyclohexene.
29. 1,2,3,5 - tetrachloro - 4 - methyl - 4 - (4 - methyl-3,4-epoxycyclohexyl)cyclohexene.
30. 4-(3,4-epoxycyclohexyl)-1-cyclohexene.
31. 5-(3,4-epoxycyclohexyl)-2-norbornene.
32. 4 - methyl - 4 - (4 - methyl - 3,4 - epoxycyclohexyl)-1-cyclohexene.
33. 5 - methyl - 5 - (4 - methyl - 3,4 - epoxycyclohexyl)-2-norbornene.
34. 1,4 - dimethyl - 4 - (4 - methyl - 3,4 - epoxycyclohexyl)-1-cyclohexene.

References Cited in the file of this patent
Harrer et al.: Chem. Abs., vol. 40, p. 1505 (1946).